US012072540B2

(12) United States Patent
Mao et al.

(10) Patent No.: US 12,072,540 B2
(45) Date of Patent: Aug. 27, 2024

(54) OPTICAL TRANSCEIVER AND METHODS OF MAKING AND USING THE SAME

(71) Applicant: Source Photonics (Chengdu) Company, Ltd., Chengdu (CN)

(72) Inventors: Jinglei Mao, Chengdu (CN); Yuanjun Huang, Chengdu (CN); Xiaohui Tang, Chengdu (CN); Jian Yang, Chengdu (CN); Jin Liu, Chengdu (CN)

(73) Assignee: SOURCE PHOTONICS (CHENGDU) COMPANY, LTD., Sichuan (CN)

( * ) Notice: Subject to any disclaimer, the term of this patent is extended or adjusted under 35 U.S.C. 154(b) by 143 days.

(21) Appl. No.: 17/414,046

(22) PCT Filed: Jul. 9, 2019

(86) PCT No.: PCT/CN2019/095233
§ 371 (c)(1),
(2) Date: Jun. 15, 2021

(87) PCT Pub. No.: WO2021/003664
PCT Pub. Date: Jan. 14, 2021

(65) Prior Publication Data
US 2022/0128774 A1   Apr. 28, 2022

(51) Int. Cl.
*G02B 6/42*   (2006.01)
*G02B 6/293*   (2006.01)
*G02B 6/38*   (2006.01)

(52) U.S. Cl.
CPC ....... *G02B 6/3885* (2013.01); *G02B 6/29361* (2013.01); *G02B 6/4214* (2013.01); *G02B 6/4249* (2013.01); *G02B 6/425* (2013.01); *G02B 6/4292* (2013.01)

(58) Field of Classification Search
CPC .. G02B 6/4214; G02B 6/4246; G02B 6/4249; G02B 6/425
See application file for complete search history.

(56) References Cited

U.S. PATENT DOCUMENTS

| | | | |
|---|---|---|---|
| 10,048,458 B2* | 8/2018 | Kawamura | ............ G02B 6/425 |
| 11,415,750 B2* | 8/2022 | Ishii | ........................ G02B 6/122 |
| 2004/0264887 A1* | 12/2004 | Rosenberg | ............... G02B 6/42 |
| | | | 385/92 |

(Continued)

*Primary Examiner* — Charlie Y Peng
(74) *Attorney, Agent, or Firm* — Central California IP Group, P.C.; Andrew D. Fortney

(57) ABSTRACT

An optical or optoelectronic transceiver and methods of making the same are disclosed. The transceiver comprises a connector configured to receive an optical fiber array, a filter that is (i) configured to reflect first optical signals having a first wavelength and (ii) transparent to second optical signals having a second wavelength, wherein each of the first and second optical signals independently has an optical path to or from the optical fiber array, a mirror in the optical path of the second optical signals configured to reflect the second optical signals, a plurality of photodiodes configured to receive a subset of the first and/or second optical signals and generate a corresponding plurality of received electrical signals therefrom, and a plurality of laser diodes configured to transmit a remainder of the first and/or second optical signals from a corresponding plurality of transmitted electrical signals.

20 Claims, 6 Drawing Sheets

(56) References Cited

U.S. PATENT DOCUMENTS

| | | | | |
|---|---|---|---|---|
| 2005/0245103 A1* | 11/2005 | Ellison | G02B 6/4246 |
| | | | 439/61 |
| 2006/0159404 A1* | 7/2006 | Vancoille | G02B 6/4201 |
| | | | 385/88 |
| 2012/0263416 A1* | 10/2012 | Morioka | G02B 6/4286 |
| | | | 385/33 |

* cited by examiner

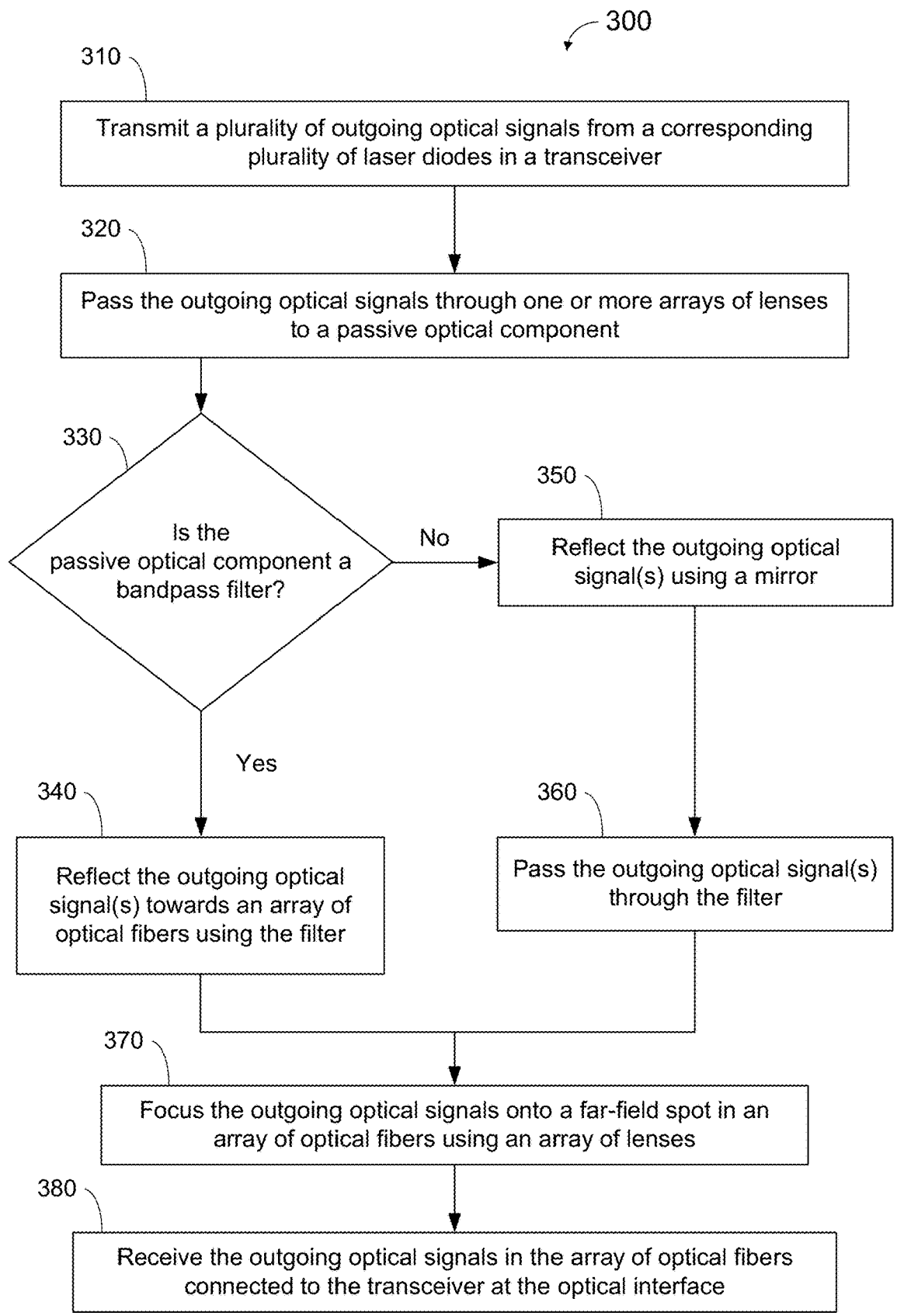

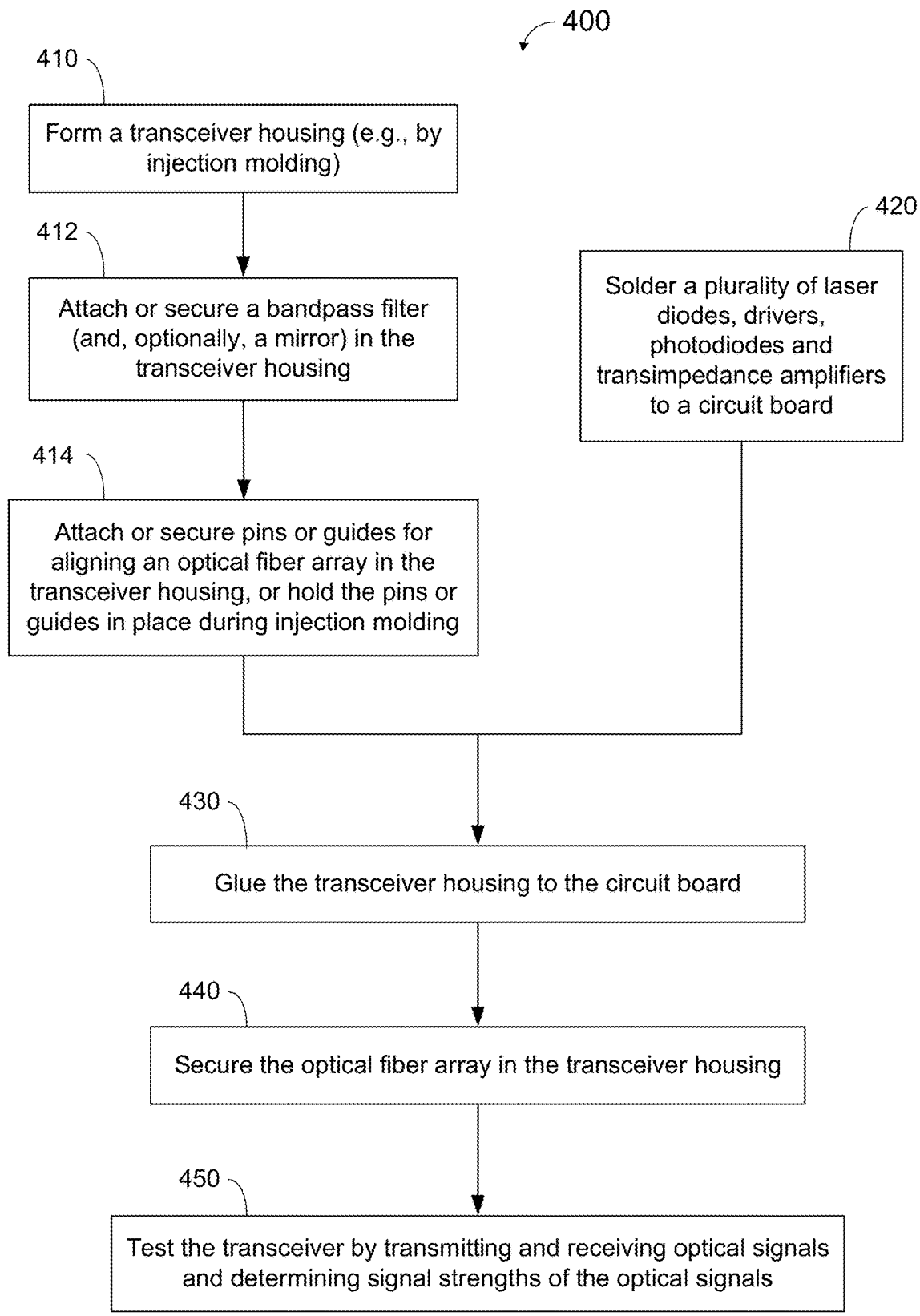

OPTICAL TRANSCEIVER AND METHODS OF MAKING AND USING THE SAME

FIELD OF THE INVENTION

The present invention relates to the field of optical or optoelectronic transceivers, and particularly to multi-channel, high-bandwidth transceivers.

DISCUSSION OF THE BACKGROUND

Optical or optoelectronic transceivers (which may be generally identified as "optical transceivers") convert electrical signals into optical signals and optical signals into electrical signals. An optical transceiver may include receiver and transmitter optical subassemblies, functional circuits, and electrical and optical interfaces, and are significant components in optical fiber communication systems and data storage networks.

There is an increasing need for greater bandwidth in optical fiber communication and data storage. Bandwidth can be increased by increasing the transmittance rate, the number of channels, or both. However, it is not easy to do either, given the constraints on optoelectronic systems and networks.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

In one aspect, the present invention relates to an optical or optoelectronic transceiver, comprising a connector configured to receive an optical fiber array, a filter, a mirror, a plurality of photodiodes, and a plurality of laser diodes. The filter is (i) configured to reflect first optical signals having a first wavelength and (ii) transparent to second optical signals having a second wavelength. Each of the first and second optical signals independently has an optical path to or from the optical fiber array. The mirror is in the optical path of the second optical signals and is configured to reflect the second optical signals. The photodiodes are configured to receive a subset of the first and/or second optical signals and generate a corresponding plurality of received electrical signals therefrom. The laser diodes are configured to transmit the remaining first and/or second optical signals from a corresponding plurality of transmitted electrical signals.

In some embodiments, the photodiodes are configured to receive either (i) all of the first optical signals or (ii) all of the second optical signals, and the laser diodes are configured to transmit all of the first or second optical signals not received by the plurality of photodiodes. Alternatively, a subset of the photodiodes is configured to receive a corresponding subset of the first optical signals, the remaining photodiodes are configured to receive a corresponding subset of the second optical signals, a subset of the laser diodes is configured to transmit the remaining first optical signals, and the remaining laser diodes are configured to transmit the remaining second optical signals.

In some embodiments, the transceiver further comprises (i) a first lens array between the connector and the filter, (ii) a second lens array between the filter and a subset of the photodiodes and/or the laser diodes, and (iii) a third lens array between the mirror and a remainder of the photodiodes and/or laser diodes. Each of the first, second and third lens arrays are configured to focus and optionally collimate the optical signals onto a target. For example, the first lens array focuses incoming or received ones of the first and second optical signals onto either the filter (for incoming or received first optical signals) or the mirror (for incoming or received second optical signals), and outgoing or transmitted ones of the first and second optical signals onto the optical fibers in the optical fiber array. The second lens array may focus (i) the incoming or received ones of the first and second optical signals that were reflected by the filter onto corresponding ones of the photodiodes and (ii) the outgoing or transmitted ones of the first and second optical signals having the first wavelength onto the filter. The third lens array may focus (i) the incoming or received ones of the first and second optical signals that were reflected by the mirror onto corresponding ones of the photodiodes and (ii) the outgoing or transmitted ones of the first and second optical signals having the second wavelength onto the mirror.

In various embodiments, the transceiver further comprises a housing configured to (i) mechanically support the filter and the mirror, (ii) define the connector, and/or (iii) protect the plurality of photodiodes and the plurality of laser diodes. The housing may comprise a cavity in an upper surface thereof, configured to house and/or support the filter and the mirror. In further embodiments, the connector comprises one or more alignment pins configured to align the optical fiber array with the first lens array. The housing may be further configured to secure and/or support the alignment pin(s).

In some embodiments, the transceiver further comprises (i) one or more amplifiers configured to amplify the plurality of received electrical signals and/or (ii) one or more laser drivers configured to provide the plurality of transmitted electrical signals. In such embodiments, the housing may further comprise (i) a first space configured to house at least one of the amplifier(s) and the laser driver(s), (ii) a second space configured to house the photodiodes and the laser diodes, and (iii) a third space configured to house the remainder of the amplifier(s) and the laser driver(s).

In another aspect, the present invention relates to a method of making an optical transceiver, comprising forming a housing having (i) a connector configured to receive an optical fiber array and (ii) a cavity in an upper surface thereof, attaching or securing a filter in the cavity, securing a plurality of laser diodes, a plurality of laser drivers, a plurality of photodiodes and a plurality of amplifiers to a circuit board such that the housing can cover the laser diodes, laser drivers, photodiodes, and amplifiers, and adhering the housing to the circuit board so that the plurality of laser diodes, the plurality of laser drivers, the plurality of photodiodes, and the plurality of amplifiers are covered by the housing. The filter is (a) configured to reflect first optical signals having a first wavelength and (b) transparent to second optical signals having a second wavelength. Each of the first and second optical signals independently has an optical path to or from the optical fiber array.

Optionally, the method may further comprise attaching or securing a mirror in the cavity. The mirror is in the optical path of the second optical signals and is configured to reflect the second optical signals. For example, the mirror may be configured to reflect the optical signals having the second wavelength. In other or further embodiments, attaching or securing the filter may comprise adhering the filter to first and second ramps, slopes or edges along first and second opposed sidewalls of the cavity.

In some embodiments, forming the housing comprises injection molding. In other or further embodiments, the connector may comprise one or more alignment pins or guides configured to align the optical fiber array with a lens array (e.g., between the connector and the filter). The housing may be configured to secure and/or support the alignment pin(s) or guide(s). For example, the alignment pin(s) or guide(s) may be held in place (e.g., by the mold) during injection molding.

In various embodiments, the method may further comprise securing the optical fiber array in the housing, testing the transceiver by transmitting and receiving optical test signals, and/or adjusting a position of one or more components until the signal strength of the transmitted and/or received optical test signals is at a maximum. Such testing ensures that the components, including the housing, are placed in an optimal position prior to use.

In yet another aspect, the present invention relates to a method of transmitting and receiving optical signals, comprising receiving first optical signals from an optical fiber array in a connector of a housing, reflecting first ones of the first optical signals having a first wavelength (if any) towards first photodiodes using a filter in the housing, passing remaining ones of the first optical signals having a second wavelength through the filter, reflecting the remaining ones of the first optical signals towards second photodiodes using a mirror in the housing, transmitting first ones of second optical signals having the second wavelength (if any) from first laser diodes towards the mirror, transmitting remaining ones of the second optical signals having the first wavelength from second laser diodes towards the filter, reflecting the first ones of the second optical signals towards corresponding optical fibers in the optical fiber array using the mirror, and reflecting the remaining ones of the second optical signals towards the optical fiber array using the filter. In some embodiments, the first and second photodiodes are configured to receive either (i) all of the first optical signals or (ii) all of the second optical signals, and the first and second laser diodes are configured to transmit all of the other optical signals (i.e., either the first optical signals or the second optical signals not received by the first and second photodiodes).

In some embodiments, a plurality of the first optical signals have the first wavelength, a plurality of the remaining ones of the first optical signals are reflected using a mirror, a plurality of the first ones of the second optical signals have the second wavelength, and a plurality of the remaining ones of the second optical signals are transmitted by the second laser diodes. For example, half of the first optical signals have the first wavelength, the remaining half of the first optical signals have the second wavelength, half of the second optical signals have the first wavelength, and the remaining half of the second optical signals have the second wavelength.

These and other features and advantages of the present invention will become readily apparent from the detailed description of various embodiments below.

BRIEF DESCRIPTION OF THE DRAWINGS

FIGS. 7A-B are flowcharts for exemplary methods of using an optical transceiver in accordance with one or more embodiments of the present invention.

FIG. 8 is a flowchart for an exemplary method of making an optical transceiver in accordance with one or more embodiments of the present invention.

DETAILED DESCRIPTION

Figure 1A:
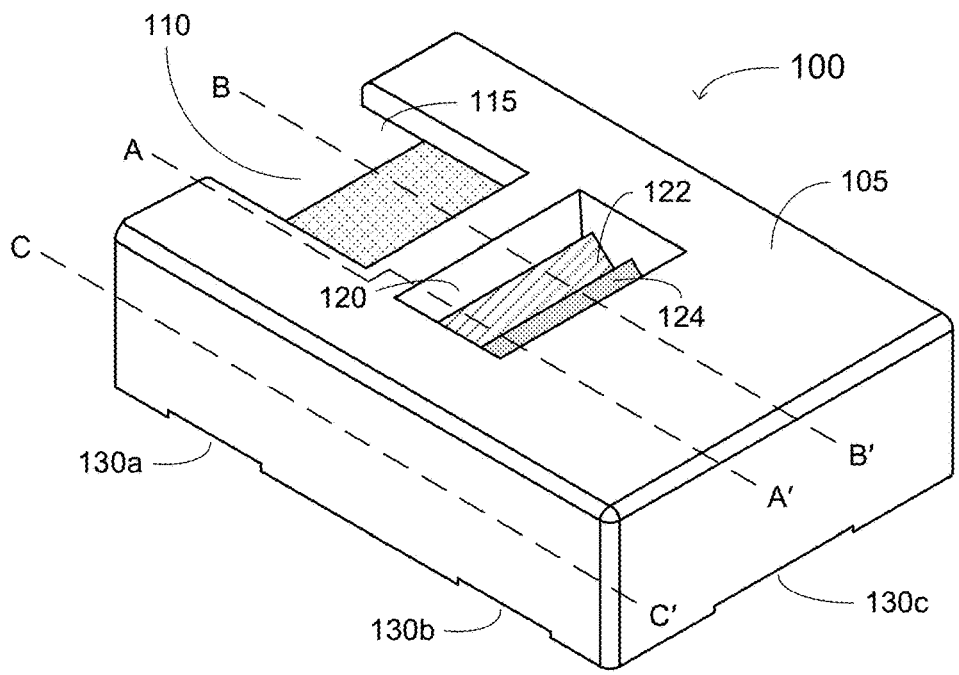
FIG. 1A is a perspective view of the top of an exemplary transceiver, in accordance with one or more embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention. Furthermore, it should be understood that the possible permutations and combinations described herein are not meant to limit the invention. Specifically, variations that are not inconsistent may be mixed and matched as desired.

For the sake of convenience and simplicity, the terms "transceiver," "optical transceiver" and "optoelectronic transceiver" may be used interchangeably, as may the terms "optical" and "optoelectronic," the terms "connected to," "coupled with," "coupled to," and "in communication with" (which include both direct and indirect connections, couplings and communications), the terms "mounting," "affixing," "attaching" and "securing" (and grammatical variations thereof), and the terms "data," "information" and "bit(s)," but these terms are generally given their art-recognized meanings.

The term "length" generally refers to the largest dimension of a given 3-dimensional structure or feature. The term "width" generally refers to the second largest dimension of a given 3-dimensional structure or feature. The term "thickness" generally refers to a smallest dimension of a given 3-dimensional structure or feature. The length and the width, or the width and the thickness, may be the same in some cases. A "major surface" refers to a surface defined by the two largest dimensions of a given structure or feature, which in the case of a structure or feature having a circular surface, may be defined by the radius of the circle.

An Exemplar Optical Transceiver

FIGS. 1A-5 show an exemplary transceiver 100. The optical transceiver 100 may have a transmission rate of 10 Gb/sec or more (e.g., 40 Gb/sec, 100 Gb/sec, 171 Gb/sec, 273 Gb/sec, 200 Gb/sec, 300 Gb/sec, 400 Gb/sec, etc.), although the transceiver 100 is not limited to such transmission rates. The transceiver 100 may be or comprise a coarse wavelength-division multiplexing (CWDM) transceiver, a dense wavelength-division multiplexing (DWDM) transceiver, a synchronous optical networking (SONET) transceiver, a Fiber Channel transceiver, a fast ethernet transceiver, or a gigabit ethernet transceiver, although the transceiver 100 is not limited to such transceiver types.

The optical transmitter 100 may transmit and receive signals in each of 8, 16, 24, 32 or more lanes or channels. A wavelength-division multiplexer (WDM) allows an outgoing optical signal having a wavelength $\lambda_1$ and an incoming optical signal having a different wavelength $\lambda_2$ to share the same lane or channel (e.g., fiber optic cable). Alternatively, the outgoing optical signal may have a wavelength of $\lambda_2$, and the incoming optical signal may have a wavelength $\lambda_1$.

The standard wavelengths for optical signals transmitted and/or received by the optical transceiver 100 may be from 400 to 1800 nm, although the present invention is not so limited. For example, the transmitted optical signals may have a wavelength of 910 nm and the received optical signals may have a wavelength of 850 nm. Alternatively, the transmitted signals may have a wavelength of 880 nm and the received signals may have a wavelength of 820 nm, or the transmitted signals may have a wavelength of 950 nm and the received signals may have a wavelength of 890 nm, etc. There may be a difference between the wavelengths of the received and the transmitted signals of 40 nm or more (e.g., 60 nm, 80 nm, etc.).

FIG. 1A is a perspective view of the top of the exemplary transceiver 100. The transceiver 100 comprises a housing 105, an optical port 110, a filter 122, and a mirror 124. The housing 105 may conform to one or more of the MAU, GBIC, SFP, SFP+, QSFP, QSFP+, OSFP, XENPAK, XFP, or CFP transceiver housing standards. The housing may comprise an optically transparent or partially transparent plastic, such as a polycarbonate, and may be manufactured using a conventional technique (e.g., injection molding). The housing 105 includes an opening 115 over the optical port 110, and a trench or recess 120 containing the filter 122 and the mirror 124. The bottommost surface of the housing 105 includes gaps 130a-c. The housing is configured to (i) mechanically support the filter 122 and the mirror 124, (ii) define the connector (optical port 110), and (iii) protect electrical components therein (e.g., photodiodes and laser diodes). In some embodiments, the trench or recess 120 in the housing 105 is sealed or capped with one or more light-blocking covers, seals or caps.

The filter 122 is configured reflect optical signals having a first wavelength $\lambda_1$ (for example, 910 nm) and let optical signals at a second wavelength $\lambda_2$ (for example, 850 nm) pass through. Thus, the filter 122 may be or comprise a low-pass filter, but can also be or comprise a high-pass filter, a band-pass filter, or a band-stop filter. In various embodiments, the filter 122 is a dichroic mirror or other beam splitter. In alternative embodiments, the filter 122 is a wavelength selective filter (e.g., made of or coated with a material that is transparent to light having a certain wavelength or wavelength band, but that largely or completely reflects light having a different wavelength or that is outside the wavelength band). The filter 122 may be at an angle of 45° with respect to the signals entering or leaving the optical fiber array, although the invention is not limited to this angle (e.g., the angle may be in a range of from 10° to 80°).

The mirror 124 is configured to reflect the optical signals having the second wavelength $\lambda_2$. The mirror 124 may be or comprise a total reflection mirror. The mirror 124 can be a simple interface with air, or may be or comprise a coating (e.g., a film comprising an elemental metal or other reflective material) deposited or evaporated onto the corresponding surface in the trench or recess 120. The mirror 124 may be at an angle of 45° with respect to the signals entering or leaving the optical fiber array, although the invention is not limited to this angle (e.g., the angle may be in a range of from 10° to 80°).

Figure 1B:
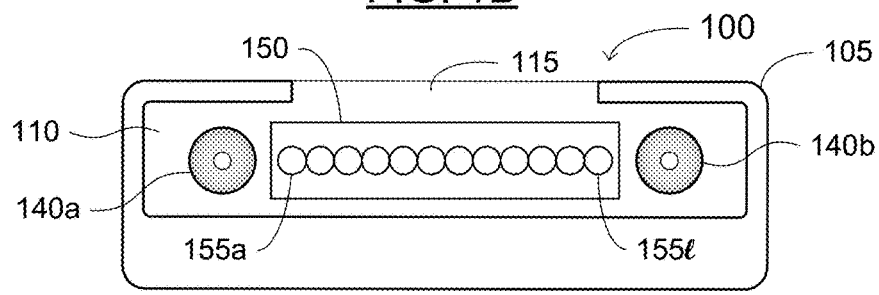
FIG. 1B is an end-on view of the optical port of the exemplary transceiver shown in FIG. 1A.

FIG. 1B is an end-on view of the optical port 110 of the exemplary transceiver 100 shown in FIG. TA. The optical port 110 is a connector configured to receive an optical fiber array. The optical port 110 may include a slim MT ferrule interface. In alternative embodiments, the optical port 110 may include a standard MT ferrule or MT jumper interface. However, the present invention is not so limited. For example, the optical port 110 may comprise an Avio, ADT-UNI, DMI, E-2000, LSH, EC, ELIO, ESCON, F07, F-3000, FC, Fibergate, FJ, LC, Lucxis, LX-5, M12-FO, MIC, MPO, PTP, MT, MT-RJ, MU, SC, SC-DC, SC-QC, SMA 905, F-SMA I, SMA 906, F-SMA II, SMC, ST, BFOC, TOSLINK, VF-45, 1053 HDTV or V-PIN optical fiber interface.

Guides or pins 140a-b receive aligned holes in an MT ferrule (not shown) to align the optical fiber array in the optical port 110 with a lens array 155a-l. A recess 150 in the back wall of the port 110 fixes the distance between the ends of the fibers in the optical fiber array and a lens array 155a-l. In some embodiments, a coating film may be applied onto the optical surface of the lens array 155a-l to protect the lenses (e.g., from dust). When the optical port 110 comprises an n-by-m array of optical fibers (where, for example, n and m are each independently integers of 2 or more), the recess 150 can have dimensions accommodating a corresponding n-by-m lens array.

The lenses in the lens array 155a-l are configured to focus the incoming optical signals onto photodiodes 197a-d and 197i-l and the outgoing optical signals that are transmitted from laser diodes 192a-d and 192i-l onto the ends of the optical fibers in the optical port 110 (e.g., after reflection by a filter 122 or a mirror 124). The lens array 155a-l may comprise an n-by-m array of lenses, where n is an integer of 1 or more and m is an integer of 4 or more. As shown in FIG. 1B, the lens array 155a-l comprises 12 lenses, which can accommodate up to 12 channels. However, in exemplary embodiments, less than 12 (e.g., 4 or 8) or greater than 12 (e.g., 16, 24, 32, etc.) lenses may be present.

When the optical port 110 (e.g., the ferrule or other optical signal medium connector) contains fewer optical fibers than the number of lenses in the transceiver 100, one or more subsets of the lenses (e.g., lenses 155a-d and 155i-l) may focus the incoming and outgoing optical signals of the optical transceiver 100. For example, the lenses 155e-h in the middle of the lens array may not be in use when the optical port 110 has four (4) optical fibers aligned with the lenses 155a-d and four (4) optical fibers aligned with the lenses 155i-l (e.g., when there is a total of 8 channels).

Figure 2:
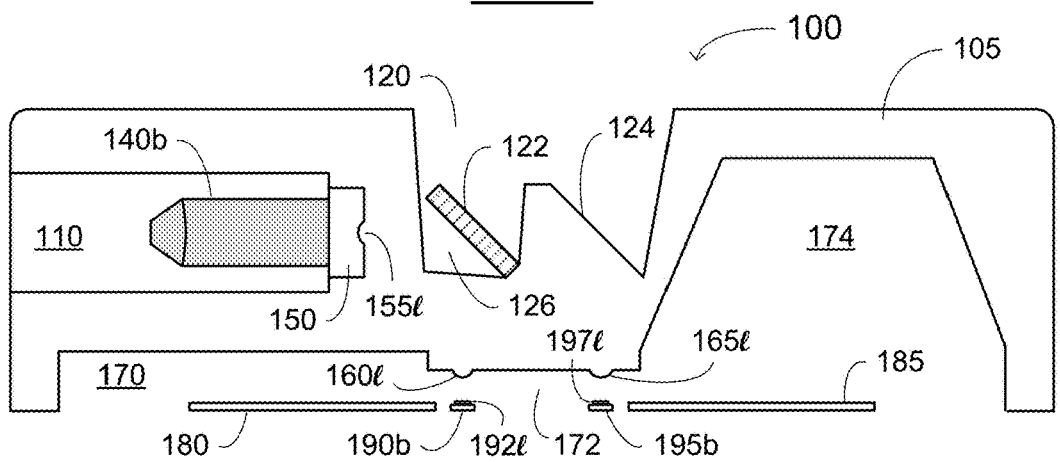
FIG. 2 is a cross-sectional view of the exemplary transceiver along the line A-A' in FIG. 1A.
Figure 3:
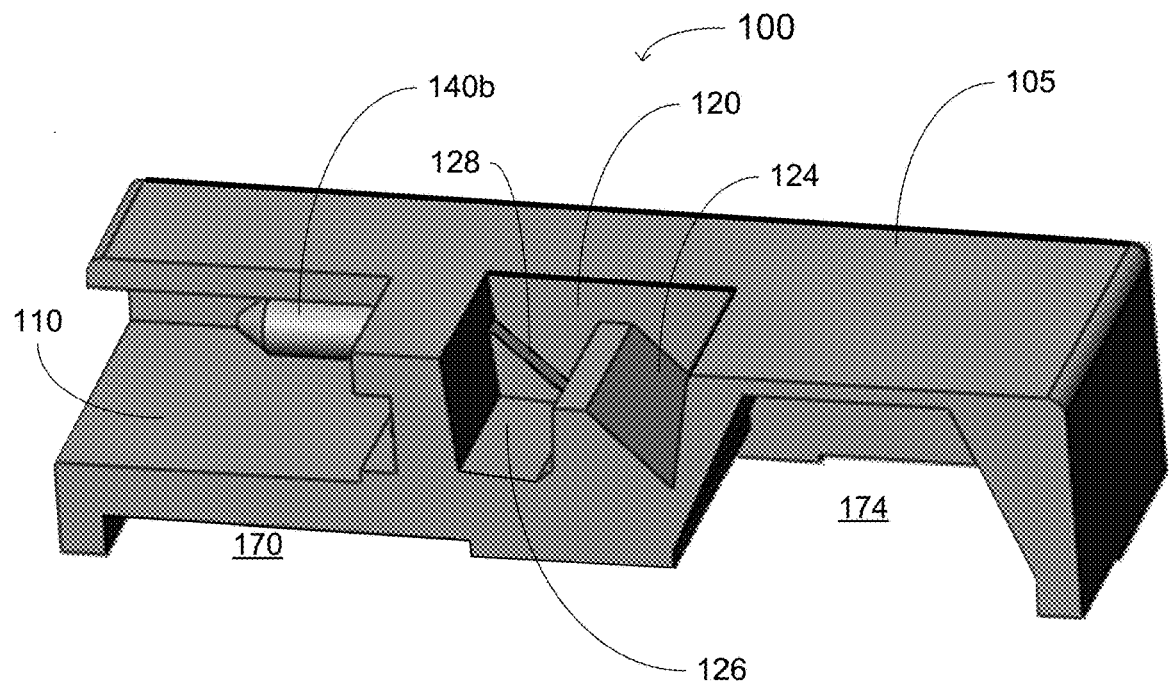
FIG. 3 is a cross-sectional view of the housing for the exemplary transceiver in FIGS. 1A-B along the line B-B' in FIG. 1A.

FIG. 2 is a cross-sectional view of the exemplary transceiver along the line A-A' in FIG. 1A. FIG. 2 shows the optical port 110, the guide or pin 140b, the trench or recess 120, the filter 122, the mirror 124, and the lens array 155a-l. A cavity 126 may be below the filter 122. As shown in FIG. 3, an angled ramp, slope, fin or ledge 128 along opposite sidewalls of the trench or recess 120 may support the filter 122 at a predetermined angle (e.g., 45°) with respect to the optical signals entering and/or leaving the optical fiber array. The ramp, slope or edge 128 may be along a side wall of the trench or recess 120, between the optical port 110 and the mirror 124.

Referring back to FIG. 2, the housing 105 includes a space 170 below the optical port 110, a space 172 below lenses 160*l* and 165*l*, and a space 174 at the back end of the transceiver 100. The lenses 160*l* and 165*l* are each part of first and second lens arrays 160*a-l* and 165*a-l*, respectively (not shown), and the space 172 is under both lens arrays. The first and second lens arrays 160*a-l* and 165*a-l* may correspond to the lens array 155*a-l* (e.g., each of the first and second lens arrays may have the same number of lenses as the array 155*a-l*, and each may be aligned with the optical path of the incoming and/or outgoing optical signals). Thus, each of the first and second lens arrays 160*a-l* may comprise an n-by-m array of lenses (where n is an integer of 1 or more, m is an integer of 4 or more, and n and m are the same for each of the lens arrays 155*a-l*, 160*a-l*, and 165*a-l*).

The first lens array 160*a-l* may focus and/or collimate optical signals emitted from optical signal transmitters (e.g. laser diodes) among the optoelectronic devices 192*a-l*, reflected by the filter 122, and received by the lens array 155*a-l* and the optical fiber array. Additionally or alternatively, the first lens array 160*a-l* may focus and/or collimate optical signals received from the optical fiber array and focused by and/or passed through the lens array 155*a-l*, reflected by the filter 122, and received by optoelectronic devices 197*a-l*.

The second lens array 165*a-l* may focus and/or collimate optical signals received from the optical fiber array and the lens array 155*a-l*, reflected by the mirror 124, and received by the optoelectronic devices 197*a-l*. Additionally or alternatively, the second lens array 165*a-l* may focus and/or collimate optical signals emitted from the optoelectronic devices 192*a-l*, reflected by the mirror 124, and received by the lens array 155*a-l* and the optical fiber array.

The lens surface parameters (e.g., face radius, face conic, face coefficients) of lenses 160*a-d* and lenses 160*i-l* may differ from each other because of the different optical paths of the optical signals passing through the lenses. Similarly, the lens surface parameters of each of the lenses 165*a-d* and each of the lenses 165*i-l* may also differ from each other when optical signals pass through the different lenses. For example, lenses 165*a-d* may have lens surface parameters that are optimal or optimized for coupling optical signals to the optical fibers (e.g., when optoelectronic devices 192*a-d* comprise optical signal transmitters that emit light having a wavelength $\lambda_1$), and lenses 165*i-l* may have different lens surface parameters that are optimal or optimized for optical signal reception (e.g., when optoelectronic devices 192*a-d* comprise photodetectors that receive light having a wavelength $\lambda_2$). Similarly, lens 165*a* may have different parameters than lens 165*d*, for example due to the different optical path lengths of the optical signals passing therethrough.

Figure 4:
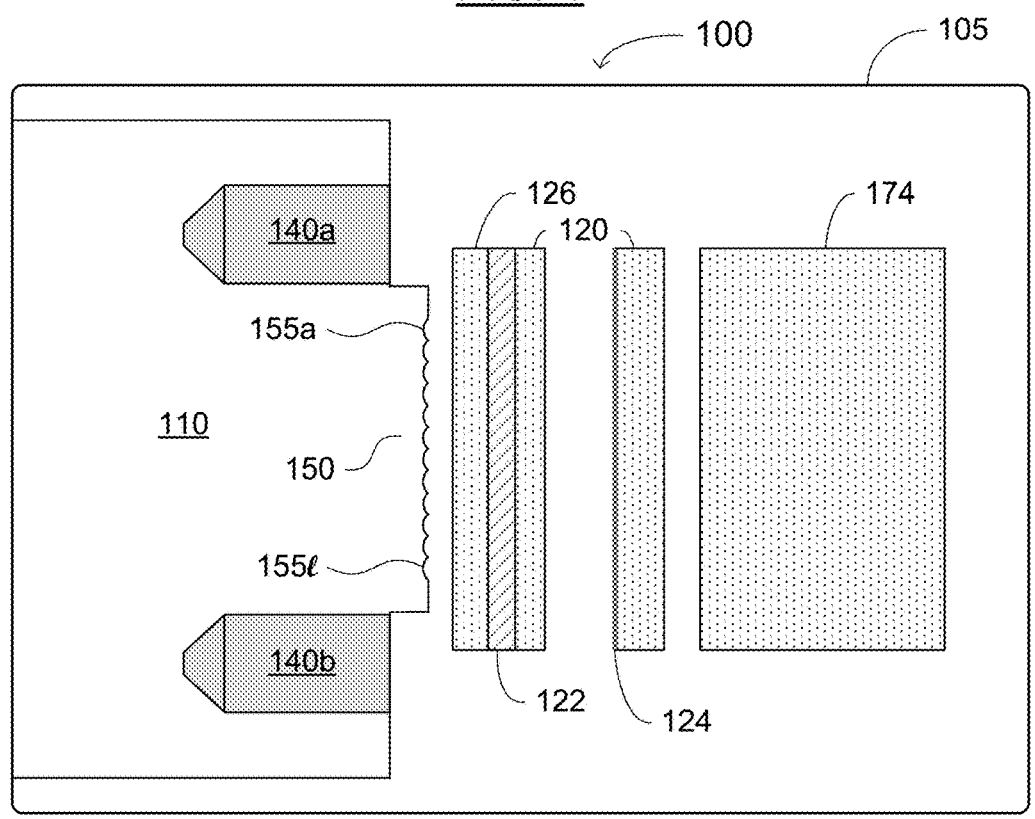
FIG. 4 is a plan view of a cross-section of the exemplary transceiver along the line C-C' in FIG. 1A.

FIG. 4 is a plan view of a cross-section of the exemplary transceiver 100 along the line C-C' in FIG. 1A. FIG. 4 shows the housing 105, optical port 110, the guides or pins 140*a-b*, the recess 150, the lens array 155*a-l*, parts of the trench or recess 120, cross-sections of the filter 122 and the mirror 124, the cavity 126, and the space 174. The lenses 160*a-d* and 160*i-l* (not shown) may be below the filter 122 on the underside of the housing 105, above the space 172. The lenses 165*a-d* and 165*i-l* (not shown) may be below the mirror 124 on the underside of the housing 105, also above the space 172.

Incoming optical signals may be output by the optical fiber array (not shown) in the optical port 110 towards the lens array 155*a-l*, which focuses and optionally collimates the signals. When the incoming optical signals have a first wavelength $\lambda_1$, they may be reflected by the filter 122, then focused and optionally collimated by the lenses in the lens array 160*a-l*. When the incoming optical signals have a second wavelength $\lambda_2$, they may pass through the filter 122, be reflected by the mirror 124, then be focused and optionally collimated by the lenses in the lens array 165*a-l*. The incoming optical signals may then be received at the photodiodes 197*a-d* and 197*i-l*.

Outgoing optical signals may be transmitted from the laser diodes 192*a-d* and 192*i-l*. When the outgoing optical signals have a first wavelength $\lambda_1$, they may be focused and optionally collimated by lenses in the lens array 160*a-d* and 160*i-l* and reflected by the filter 122 towards the lenses in the lens array 155*a-l*, where they are focused onto a corresponding far-field spot in the corresponding optical fiber in the optical fiber array in the optical port 110. When the outgoing optical signals have a second wavelength $\lambda_2$, they may be focused and optionally collimated by lenses in the lens array 165*a-d* and 165*i-l*, and reflected by the mirror 124 towards the filter 122. The outgoing optical signals having the second wavelength $\lambda_2$ pass through the filter 122 and are focused by lenses in the lens array 155*a-l* onto a corresponding far-field spot in the corresponding optical fiber in the optical fiber array. In some embodiments, one or more optical isolators may be between the laser diodes 192*a-d* and 192*i-l* and the filter 122 or mirror 124, and may be configured to rotate the outgoing optical signals by a predetermined amount (e.g., number of degrees or radians) in a predetermined direction.

Figure 5:
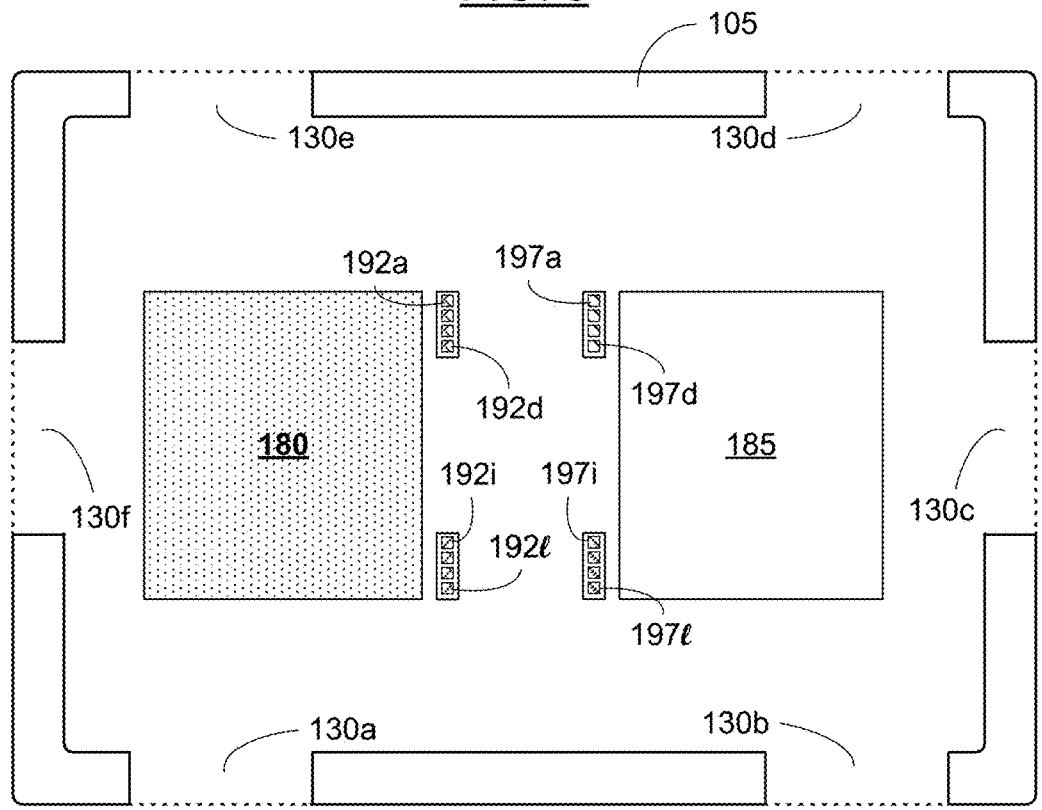
FIG. 5 is a plan or layout view of the footprint of and electrical components within the exemplary transceiver shown in FIG. 1A.

FIG. 5 is a view of the layout of electrical devices in the transceiver 100, mounted or soldered on a circuit board (not shown). FIG. 5 shows an embodiment in which the laser diodes 192*a-d* and 192*i-l* are electrically connected to a single driver (e.g., a laser driver integrated circuit [IC]) 180, and the photodiodes 197*a-d* and 197*i-l* are electrically connected to a single amplifier (e.g., a transimpedance amplifier [TIA]) IC 185. The ICs 180 and 185 may comprise a plurality of functional blocks in parallel, each of the blocks having separate input/output (I/O) pins that may accept serial or parallel data.

The laser diodes 192*a-d* and 192*i-l* may be or comprise a vertical-cavity surface-emitting laser (VCSEL) diode, although the invention is not limited to such a laser source type. For example, the laser diodes 192*a-d* and 192*a-l* may be or comprise double heterostructure lasers, quantum well lasers, quantum cascade lasers, interband cascade lasers, separate confinement heterostructure lasers, distributed Bragg Reflector lasers, distributed feedback lasers, vertical-external-cavity surface-emitting-lasers, or external-cavity diode lasers.

The driver IC 180 may receive electrical data signals from an electrical interface (not shown) and send data driving signals or pulses to modulators in the laser diodes 192*a-d* and 192*i-l*. The electrical interface may receive the data signals from a host or other device in a network and may comprise, for example, conventional golden finger connectors on a circuit board. The laser diodes 192*a-d* and 192*i-l* may receive a bias signal or voltage from a bias control circuit (not shown). Alternatively, the laser diodes 192*a-d* and 192*i-l* may receive the data driving signals or pulses directly from the driver IC 180, in which case the modulators may not be present.

The photodiodes 197*a-d* and 197*i-l* may be or comprise a PN photodiode, a PIN photodiode, an avalanche photodiode, or a Schottky photodiode, although the invention is not limited to such photodiodes. In various embodiments, each of the photodiodes 197a-d and 197i-l may have a relatively small area (e.g., ≤25 µm², ≤20 µm², ≤15 µm², etc.) and/or be optimized to receive light having a predetermined wavelength (e.g., in the range of 1200-1700 nm, such as 1270 nm, 1310 nm, 1550 nm, 1577 nm, etc., or in the range of 800-2000 nm, such as 850 nm and the previously mentioned wavelengths). The photodiodes 197a-d and 197i-l may be connected to the TIA IC 185, and the laser diodes 192a-d and 192i-l may be connected to the laser driver IC 180, by traces, wire bonds, and/or ball bonds.

The laser diodes 192a-d and 192i-l are each configured to convert an outgoing electrical signal to an outgoing optical signal. The driver IC 180 is configured to receive electrical data (e.g., from a storage network or a host device) and provide the outgoing electrical signals in parallel to the laser diodes 192a-d and 192i-l to be converted to the outgoing optical signals.

A closed-loop automatic power control (APC) regulator or loop comprising one or more monitoring photodiodes (MPDs), one or more analog-to-digital converters, a microcontroller or other processor, and the driver IC 180 may maintain a target optical output power from the laser diodes 192a-d and 192i-l. The temperature of the laser diodes 192a-d and 192i-l and the modulators may be controlled by regulating the power supplied to them. For example, when the temperature of one or more of the laser diodes 192a-d and 192i-l is too high, the corresponding bias from the bias control circuit may be reduced, and when the temperature of one or more of the laser diodes 192a-d and 192i-l is too low, the corresponding bias from the bias control circuit may be increased. A similar or different temperature control circuit may control the temperature of the photodiodes 197a-d and 197i-l.

The photodiodes 197a-d and 197i-l are each configured to convert an incoming optical signal to an incoming electrical signal. The TIA IC 185 is configured to amplify the incoming electrical signals from the photodiodes 197a-d and 197i-l and provide amplified electrical signals in parallel to the host device, storage network, or other electrical signal processor or receiver (e.g., in the optical network). The TIA IC 185 may further include a limiting amplifier (not shown) that further amplifies the amplified electrical signal. Alternatively, the limiting amplifier may be on one or more separate ICs. In some embodiments, the TIA IC 185 may further comprise one or more electrical filters (e.g., lowpass, highpass, and/or bandpass filters).

There may be more than one driver IC 180 and more than one TIA IC 185, in which case the plurality of driver ICs 180 may be arranged in parallel with each other (adjacent to the laser diodes 192a-d and 192i-l), and the plurality of TIA ICs 185 may be arranged in parallel with each other (adjacent to the photodiodes 197a-d and 197i-l).

The housing 105 may be glued or adhered (e.g., with an epoxy) to the circuit board to cover the laser diodes 192a-d and 192i-l, the driver 180, photodiodes 197a-d and 197i-l, and the TIA 185 thereon. The circuit board may be coextensive with the housing 105 or may extend slightly beyond the outer borders of the housing 105. Gaps 130a-f in the foot or lowermost surface of the housing 105 may increase the adhesion of the housing 105 to the circuit board when the glue or adhesive is applied (e.g., to the board and/or the housing 105, such that it fills the gaps 130a-f). The gaps 130a-f may have a height or depth (e.g., from the lowermost surface of the housing 105) of 1-5 mm, but the gaps 130a-f are not limited to this dimension.

In the exemplary embodiment shown in FIG. 5, optical signals having the first wavelength $\lambda_1$ are emitted by the laser diodes 192a-d and 192i-l, and optical signals having the second wavelength $\lambda_2$ are received by the photodiodes 197a-d and 197i-l. Thus, for the embodiment shown in FIG. 5, the plurality of photodiodes 197a-d and 197i-l are configured to receive all of the second optical signals having the second wavelength, and the plurality of laser diodes 192a-d and 192i-l are configured to transmit all of the first optical signals having the first wavelength. Alternatively, the photodiodes 197a-d and 197i-l can receive all of the first optical signals having the first wavelength, and the laser diodes 192a-d and 192i-l can transmit all of the second optical signals having a second wavelength.

Figure 6:
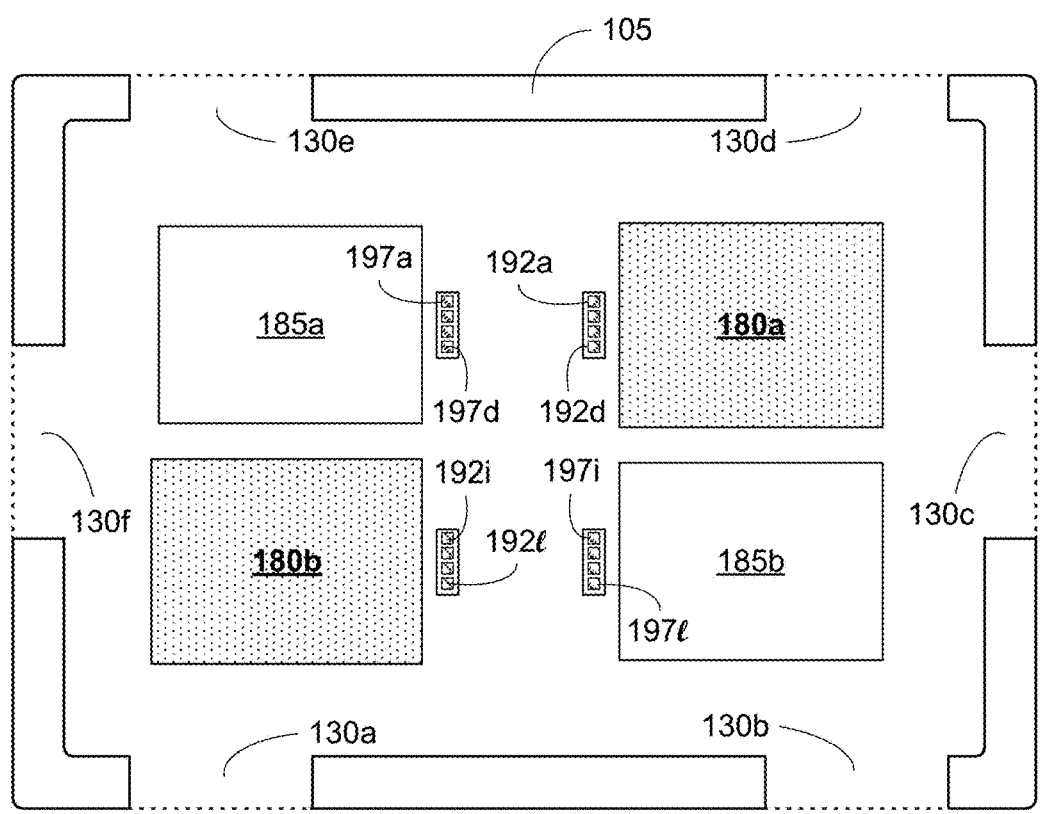
FIG. 6 is an alternative layout of the electrical components shown in FIG. 4.

FIG. 6 shows an alternative embodiment in which the laser diodes 192a-d are connected to a first driver IC 180a, the laser diodes 192i-l are connected to a second driver IC 180b, the photodiodes 197a-d are connected to a first TIA IC 185a, and the photodiodes 192i-l are connected to a second TIA IC 185b. In this embodiment, some (e.g., half) of the transmitted optical signals and some (e.g. half) of the received optical signals may have the first wavelength $\lambda_1$, and the remaining transmitted optical signals (e.g., the remaining half) and the remaining received optical signals (e.g., the remaining half) may have the second wavelength $\lambda_2$. For example, optical signals having the first wavelength $\lambda_1$ may be emitted by laser diodes 192a-d and received by photodiodes 197a-d, and optical signals having the second wavelength $\lambda_2$ may be emitted by laser diodes 192i-l and received by photodiodes 197i-l. The driver ICs 180a-b and the TIA ICs 185a-b may comprise separate or parallel functional processing blocks with separate I/Os; signals from the TIA ICs 185a-b may be routed to an electrical interface, and signals to the driver ICs 180a-b may be routed from an electrical interface.

Thus, for the embodiment shown in FIG. 6, the photodiodes 197a-d are configured to receive a corresponding subset of the first optical signals having the first wavelength, the photodiodes 197i-l are configured to receive a corresponding subset of the second optical signals having the second wavelength, the laser diodes 192i-l are configured to transmit the remainder of the first optical signals having the first wavelength and the laser diodes 192a-d are configured to transmit the remainder of the second optical signals having the second wavelength.

Exemplary Methods of Using an Optical Transceiver

Figure 7A:
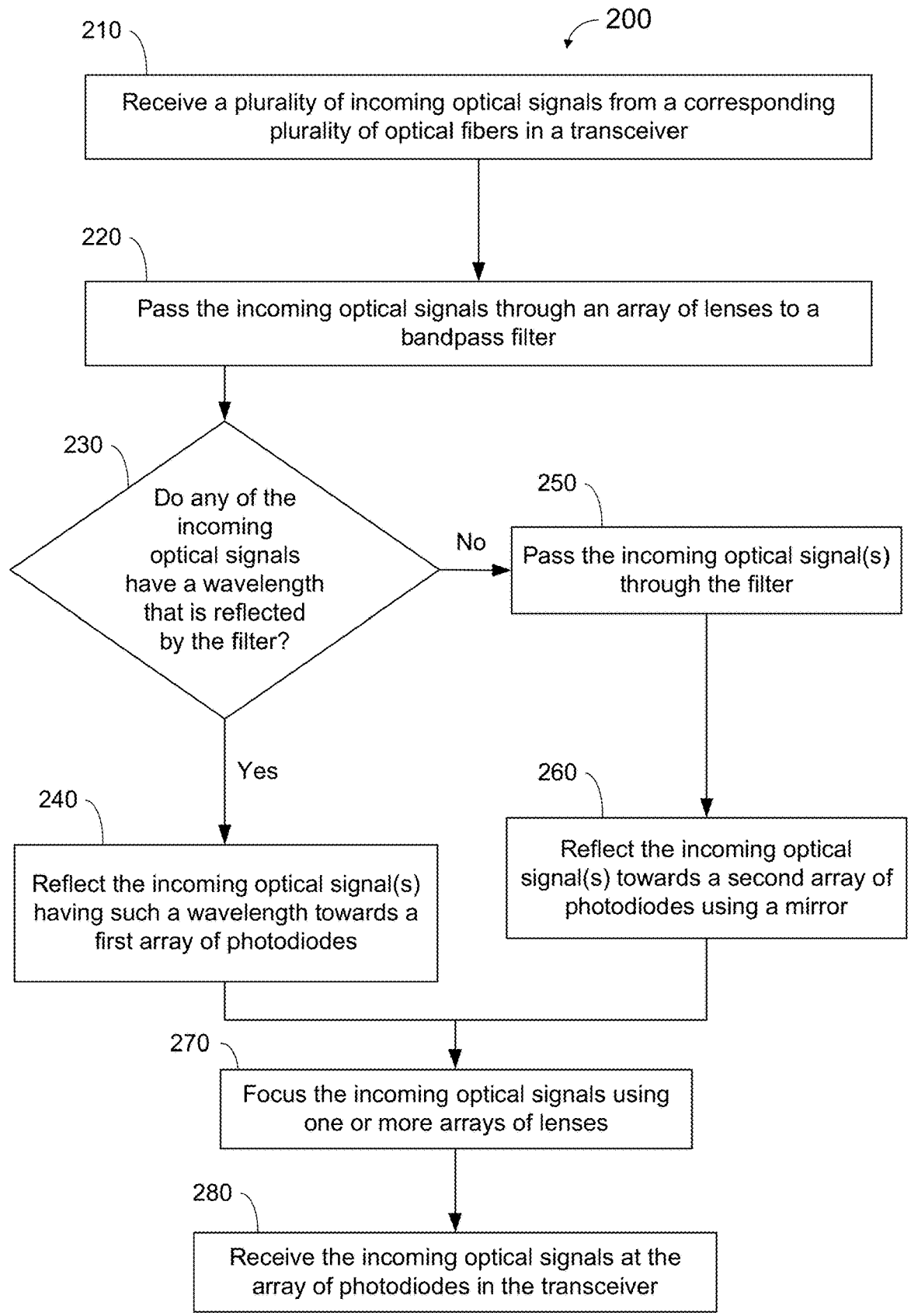

FIG. 7A is a flowchart showing an exemplary method 200 of receiving a plurality of incoming optical signals using an optical or optoelectronic transceiver in accordance with the present invention.

At 210, the incoming optical signals are received through a corresponding plurality of optical fibers operably connected to the transceiver. Generally, there is one optical fiber for each incoming optical signal. The optical fibers may be joined or bundled in an array in a connector configured to connect the fibers to the transceiver at an optical interface in the transceiver. The optical fibers may be secured to the transceiver housing using a conventional connector, as described herein. The optical fibers may be aligned with a lens array using alignment guides or pins in the connector or optical interface. Each of the incoming optical signals may have a wavelength from 400 to 2000 nm (e.g., 860 nm), as described elsewhere herein.

At 220, the incoming optical signals pass through the lens array. The lens array focuses the optical signals (e.g., onto a bandpass filter or other target, such as a mirror). Optionally, the lenses in the lens array collimate the optical signals.

In the exemplary method 200, each of the incoming optical signals takes a different optical path, depending on the location of the optical fiber and the wavelength of the optical signal. At 230, the incoming optical signals impinge on a filter. The filter is configured to reflect incoming optical signals having a first wavelength, but is transparent to incoming optical signals having a second, different wavelength. The filter may be or comprise a low-pass filter, but can also be or comprise a high-pass filter, a band-pass filter, or a band-stop filter.

When the incoming optical signals have the first wavelength, at 240, those incoming optical signals are reflected by the filter towards a first array of photodiodes or other photodetectors. The filter may have an angle of 45° with respect to the incoming optical signals, although the invention is not limited to this angle (e.g., the angle may be in a range of from 10° to 80°).

When the incoming optical signals have the second wavelength, at 250, such incoming optical signals pass through the filter. At 260, the incoming optical signals having the second wavelength are reflected by a mirror towards a second array of photodiodes or other photodetectors. The mirror may have an angle of 45° with respect to the incoming optical signals, although the invention is not limited to this angle (e.g., the angle may be in a range of from 10° to 80°). In certain embodiments, all of the incoming optical signals have either the first wavelength or the second wavelength. Alternatively, some (e.g., half) of the incoming optical signals have the first wavelength, and the remainder of the incoming optical signals have the second wavelength.

At 270, the incoming optical signals may be focused onto the first and second arrays of photodiodes or other photodetectors by one or more lens arrays between the photodiodes and either the filter or the mirror. There may be one lens array between the first array of photodiodes and the filter, and another lens array between the second array of photodiodes and the mirror. The lenses in the one lens array may have different dimensions (e.g., diameters, curvatures, etc.) than those in the other lens array due to the different optical path lengths of the corresponding incoming optical signals, the different wavelengths of light, etc.

At 280, each of the incoming optical signals is received at a photodiode. The photodiodes convert the incoming optical signals to an incoming or received electrical signal. Some part of one or more of the incoming optical signals or incoming or received electrical signals may be sampled to determine the received signal strength of the incoming optical signals and provide feedback to the source of the incoming optical signals or the network (e.g., to increase or decrease the power with which the optical signals are sent when the received signal strength differs from a target value by more than a threshold amount). A transimpedance amplifier and an optional limiting amplifier may amplify the incoming or received electrical signals from the photodiodes.

FIG. 7B is a flowchart showing an exemplary method 300 of transmitting a plurality of outgoing optical signals using an optical or optoelectronic transceiver in accordance with the present invention.

At 310, the outgoing optical signals are transmitted from a corresponding plurality of laser diodes or other optical signal generators. Prior to transmitting the outgoing optical signals, a laser driver may generate the outgoing electrical signals to be converted to the outgoing optical signals from electrical signals received over an electrical interface from a host or storage device in a network. The outgoing optical signals may have a wavelength different from that of the incoming optical signals, but still within the range of from 400 to 2000 nm (e.g., 860 nm), as described herein. Some part of one or more of the outgoing optical signals may be sampled to determine the power or signal strength of the outgoing optical signals and provide feedback to the laser driver(s) or a controller or processor controlling the laser driver(s) (e.g., to increase or decrease the power with which the optical signals are sent when the determined power or signal strength of the outgoing optical signal[s] differ from a target value by more than a threshold amount).

At 320, the outgoing optical signals pass through one or more lens arrays, which focus the optical signals onto a passive optical component (e.g., a bandpass filter or a mirror) and optionally collimate the optical signals. When the passive optical component is a filter, the outgoing optical signals have a first wavelength, and when the passive optical component is a mirror, the outgoing optical signals have a second, different wavelength. The filter may be or comprise a low-pass filter, but can also be or comprise a high-pass filter, a band-pass filter, or a band-stop filter, as described herein. As for the exemplary method 200 in FIG. 7A, there may be one lens array between a first group or array of the laser diodes and the mirror, and another lens array between a second groups or array of the laser diodes and the bandpass filter.

Each of the outgoing optical signals travels along a different optical path, depending on the position of the laser diode, the location of an optical fiber that receives the outgoing optical signal, the wavelength of the outgoing optical signal, etc. At 330, when the passive optical component is a filter (i.e., the outgoing optical signal[s] has/have the first wavelength), the outgoing optical signals are reflected by the filter at 340 towards an array of optical fibers operably connected to the optical transceiver at an optical interface, as described herein. The filter may have an angle of 45° with respect to the outgoing optical signals, although the invention is not limited to this angle (e.g., the angle may be in the range of from 10° to 80°).

At 330, when the passive optical component is a mirror (i.e., the outgoing optical signal[s] has/have the second wavelength), the outgoing optical signals are reflected by the mirror at 350 towards the same or a different array of optical fibers. The mirror may have an angle of 45° with respect to the outgoing optical signals, although the invention is not limited to this angle (e.g., the angle may be in the range of from 10° to 80°). In certain embodiments, all of the outgoing optical signals have either the first wavelength or the second wavelength. Alternatively, some (e.g., half) of the outgoing optical signals have the first wavelength, and the remainder of the outgoing optical signals have the second wavelength. Also, the filter and the mirror may be the same as those used in the exemplary method 200 in FIG. 7A.

At 360, the outgoing optical signals having the second wavelength pass through the filter, which is transparent to optical signals having the second wavelength. At 370, the outgoing optical signals are focused onto a far-field spot in an array of optical fibers using an array of lenses. The array of lenses is in the optical path of the outgoing optical signals, between the filter and the optical fibers, and may be the same array of lenses used in the method 200 in FIG. 7A. The lenses focusing outgoing optical signals having the second wavelength may have different dimensions (e.g., diameters, curvatures, etc.) from the outgoing optical signals having the first wavelength, as they may have different half-max beam widths at the location of the lenses. the array of lenses may also collimate the outgoing optical signals.

At 380, the outgoing optical signals are transmitted to a corresponding plurality of optical fibers. The optical fibers are connected to the transceiver at the optical interface. Generally, there is one optical fiber for each outgoing optical signal. The optical fibers may be joined or bundled in an array in a connector configured to connect to the transceiver at an optical interface in the transceiver. The optical fibers may be aligned with the array of lenses in 370. The optical fibers may be secured to the transceiver housing using alignment guides or pins in the connector or optical interface.

An Exemplary Method of Making an Optical Transceiver

FIG. 8 is a flowchart showing an exemplary method 400 of making an optical transceiver in accordance with various embodiments of the present invention.

At 410, a transceiver housing is manufactured (e.g., by injection molding). The housing may conform to one or more of the MAU, GBIC, SFP, SFP+, QSFP, QSFP+, OSFP, XENPAK, XFP, or CFP transceiver housing standards. The housing may include an opening over an optical port or interface, and a trench or recess configured to hold a filter and a mirror. A lens array may be formed in or attached to a sidewall in the optical interface of the housing, to focus and optionally collimate optical signals from and/or to an optical fiber array that connects to the housing at the optical interface. The region of the trench configured to hold the filter may have a sloped fin, bead or ledge along opposite sidewalls of the trench or recess to support the filter at a predetermined angle (e.g., 45°) with respect to the optical signals reflected by or passing through the filter. A cavity may be formed in the underside of the housing. The cavity is configured to house a plurality of electronic devices (e.g., laser diodes, photodiodes, laser drivers and amplifiers. One or more arrays of lenses may be formed in or attached to the underside of the housing in the cavity, in locations corresponding to (e.g., over) locations of the laser diodes and photodiodes on a circuit board or other mechanical substrate. The bottommost surface of the housing may include gaps which may increase the adhesion of the housing to the circuit board or other mechanical substrate when an adhesive or glue is applied thereto.

At 412, a bandpass filter (e.g., 122 in FIGS. 1A and 2) is attached or secured in the trench or recess in the transceiver housing. Optionally, a mirror may be formed on or affixed to a sloped surface (e.g., 124; see FIG. 2) in the trench or recess. Alternatively, the mirror may be a total reflection mirror at the interface between the housing and the external atmosphere (e.g., air). The filter is configured reflect optical signals having a first wavelength $\lambda_1$ (for example, 910 nm), but is transparent or substantially transparent to optical signals at a second wavelength $\lambda_2$ (for example, 850 nm). Thus, the filter may be or comprise a low-pass filter, but can also be or comprise a high-pass filter, a band-pass filter, or a band-stop filter. The filter 122 may be at an angle of 45° with respect to the signals entering or leaving the transceiver housing, although the invention is not limited to this angle (e.g., the angle may be in a range of from 10° to 80°).

The mirror (e.g., 124 in FIG. 1A) is configured to reflect the optical signals having the second wavelength $\lambda_2$. The mirror may be or comprise a total reflection mirror. The mirror can be a simple interface with air, or may be or comprise a coating (e.g., a film comprising an elemental metal or other reflective material) deposited or evaporated onto the corresponding surface. The mirror may be at an angle of 45° with respect to the signals entering or leaving the transceiver housing, although the invention is not limited to this angle (e.g., the angle may be of from 10° to 80°). The filter is generally parallel with the mirror or housing surface supporting the mirror, and may be spaced apart from the mirror or housing surface supporting the mirror by a distance of 1-15 mm.

At 414, pins or guides for aligning an optical fiber array are attached or secured in the transceiver housing. In one embodiment, the pins or guides may be held in place during injection molding, and the housing is molded to one end of each alignment pin or guide. The guides or pins are configured to mate with and/or be received in holes in a connector of an optical fiber array (e.g., an MT ferrule or other standard fiber connector) to align the fiber array with the lens array at the optical interface of the housing.

Separately, and generally in parallel with 410-414, a plurality of electrical devices (e.g., laser diodes, one or more laser drivers, photodiodes, and one or more amplifiers, such as transimpedance amplifiers and limiting amplifiers) are connected to a circuit board at 420. Generally, the electrical devices are connected to the circuit board by soldering, but the invention is not limited thereto. Prior to connecting the electrical devices to the circuit board, traces configured to electrically connect the electrical devices to each other or to an electrical interface of the transceiver are formed on the circuit board. The traces may be formed by printing or by blanket deposition and photolithography, although the present invention is not limited to these techniques. for example, traces may be formed to electrically connect the electrical interface to the laser driver(s), the laser driver(s) to the laser diodes, the photodiodes to one or more transimpedance amplifiers, and the transimpedance amplifier(s) to one or more limiting amplifiers or to the electrical interface. If traces connect the transimpedance amplifier(s) to the limiting amplifier(s), additional traces may electrically connect the limiting amplifier(s) to the electrical interface. The method 400 may (further) comprise connecting the electrical devices to the traces using conventional wire bonds and/or ball bonds.

At 430, the transceiver housing is glued or adhered to the circuit board (e.g., using an epoxy adhesive, which may be heat- and/or ultraviolet light-curable). The gaps in the housing may increase or improve the adhesion of the housing to the circuit board.

At 440, the optical fiber array is secured in the transceiver housing. The connector surrounding the optical fiber array may receive the alignment guides or pins to align the optical fiber array with the lens array on the sidewall in the optical interface of the transceiver.

At 450, the transceiver may be tested by transmitting and receiving optical signals and determining signal strengths of the transmitted and received optical signals. If incoming optical signals having a minimum threshold signal strength are not received and/or outgoing optical signals having a minimum threshold signal strength are not transmitted, then positions and/or angles of the housing and/or components within the housing may be adjusted or changed. For example, the filter or mirror may be realigned, the laser diodes or photodiodes may be repositioned on the circuit board, the housing may be moved (prior to curing) in one or more directions by minimum incremental distances until a maximum signal strength is found, etc.

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An optical or optoelectronic transceiver, comprising:
a connector configured to receive an optical fiber array;
a filter that is (i) configured to reflect first optical signals having a first wavelength and (ii) transparent to second optical signals having a second wavelength, wherein each of the first and second optical signals independently has an optical path to or from the optical fiber array;
a mirror in the optical path of the second optical signals, configured to reflect the second optical signals;
a plurality of photodiodes configured to receive a subset of the first and/or second optical signals and generate a corresponding plurality of received electrical signals therefrom; and
a plurality of laser diodes configured to transmit a remainder of the first and/or second optical signals from a corresponding plurality of transmitted electrical signals, wherein:
(i) a subset of the plurality of photodiodes is configured to receive a corresponding subset of the first optical signals, and a remainder of the plurality of photodiodes are configured to receive a corresponding subset of the second optical signals, and
(ii) a subset of the plurality of laser diodes is configured to transmit a remainder of the first optical signals, and a remainder of the plurality of laser diodes are configured to transmit a remainder of the second optical signals.

2. The transceiver of claim 1, wherein the plurality of photodiodes are configured to receive either (i) all of the first optical signals or (ii) all of the second optical signals, and the plurality of laser diodes are configured to transmit all of the first or second optical signals not received by the plurality of photodiodes.

3. The transceiver of claim 1, further comprising a first lens array between the connector and the filter.

4. The transceiver of claim 3, further comprising (i) a second lens array between the filter and a subset of the photodiodes and/or the laser diodes, and (ii) a third lens array between the mirror and a remainder of the photodiodes and/or laser diodes.

5. The transceiver of claim 3, further comprising a housing configured to (i) mechanically support the filter and the mirror, (ii) define the connector, and (iii) protect the plurality of photodiodes and the plurality of laser diodes.

6. The transceiver of claim 5, wherein the connector comprises one or more alignment pins configured to align the optical fiber array with the first lens array, and the housing is further configured to secure and/or support the one or more alignment pins.

7. The transceiver of claim 5, further comprising (i) one or more amplifiers configured to amplify the plurality of received electrical signals and (ii) one or more laser drivers configured to provide the plurality of transmitted electrical signals.

8. The transceiver of claim 7, wherein the housing comprises (i) a cavity in an upper surface thereof, configured to house and/or support the filter and the mirror, and (ii) a first space configured to house at least one of the one or more amplifiers and the one or more laser drivers.

9. The transceiver of claim 5, wherein the housing comprises a cavity in an upper surface thereof, configured to house and/or support the filter and the mirror.

10. The transceiver of claim 9, wherein the housing further comprises a space configured to house the plurality of photodiodes and the plurality of laser diodes.

11. The transceiver of claim 8, wherein the housing further comprises a second space configured to house the plurality of photodiodes and the plurality of laser diodes.

12. The transceiver of claim 11, wherein the housing further comprises a third space configured to house a remainder of the one or more amplifiers and the one or more laser drivers.

13. A method of making an optical transceiver, comprising:
forming by injection molding a housing having (i) a connector configured to receive an optical fiber array and (ii) a cavity in an upper surface thereof;
forming or securing one or more alignment pins in the connector by holding the one or more alignment pins in place by a mold during the injection molding, wherein the one or more alignment pins are configured to align the optical fiber array with the filter and the mirror, and the housing is configured to secure and/or support the one or more alignment pins;
attaching or securing a filter in the cavity, wherein the filter is (a) configured to reflect first optical signals having a first wavelength and (b) transparent to second optical signals having a second wavelength, and each of the first and second optical signals independently has an optical path to or from the optical fiber array,
optionally, forming a mirror in the cavity, wherein the mirror is in the optical path of the second optical signals and configured to reflect the second optical signals;
securing a plurality of laser diodes, a plurality of laser drivers, a plurality of photodiodes and a plurality of amplifiers to a circuit board such that the housing can cover the plurality of laser diodes, the plurality of laser drivers, the plurality of photodiodes, and the plurality of amplifiers; and
gluing the housing to the circuit board so that the plurality of laser diodes, the plurality of laser drivers, the plurality of photodiodes, and the plurality of amplifiers are covered by the housing.

14. The method of claim 13, further comprising securing the optical fiber array in the connector.

15. The method of claim 14, comprising testing the transceiver by transmitting and receiving optical signals having the first wavelength and the second wavelength.

16. The method of claim 13, wherein the mirror is configured to reflect the optical signals having the second wavelength.

17. The method of claim 13, wherein attaching or securing the filter comprises adhering the filter to first and second ramps, slopes or edges along first and second opposed sidewalls of the cavity.

18. A method of transmitting and receiving optical signals, comprising:
receiving first optical signals from an optical fiber array in a connector of a housing;
reflecting first ones of the first optical signals having a first wavelength, if any, towards first photodiodes using a filter;

passing remaining ones of the first optical signals having a second wavelength through the filter;

reflecting the remaining ones of the first optical signals towards second photodiodes using a mirror;

transmitting first ones of second optical signals having the second wavelength, if any, from first laser diodes towards the mirror;

transmitting remaining ones of the second optical signals having the first wavelength from second laser diodes towards the filter;

reflecting the first ones of the second optical signals towards corresponding optical fibers in the optical fiber array using the mirror;

reflecting the remaining ones of the second optical signals towards the optical fiber array using the filter.

19. The method of claim 18, wherein the first and second photodiodes are configured to receive either (i) all of the first optical signals or (ii) all of the second optical signals, and the first and second laser diodes are configured to transmit all of the first or second optical signals not received by the first and second photodiodes.

20. The method of claim 18, wherein (i) a plurality of the first optical signals have the first wavelength, (ii) a plurality of the remaining ones of the first optical signals are reflected using a mirror, (iii) the first ones of the second optical signals have the second wavelength, and (iv) a plurality of the remaining ones of the second optical signals are transmitted by the second laser diodes.

* * * * *